(12) United States Patent
Blank et al.

(10) Patent No.: US 6,540,255 B1
(45) Date of Patent: Apr. 1, 2003

(54) DISTRIBUTED ELECTRONIC ACCELERATION SENSING FOR CRASH SEVERITY RECOGNITION

(75) Inventors: Thomas Blank, Karlsruhe (DE); Emmanuel Garcia, Sterling Heights, MI (US); Oskar Leirich, Neutraubling (DE); Markus Heiser, Alzehau (DE)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/694,097

(22) Filed: Oct. 20, 2000

Related U.S. Application Data

(60) Provisional application No. 60/160,658, filed on Oct. 21, 1999.

(51) Int. Cl.⁷ .............................................. B60R 21/32
(52) U.S. Cl. ........................................ 280/735; 701/45
(58) Field of Search ............................ 280/735; 701/45

(56) References Cited

U.S. PATENT DOCUMENTS

| | | | |
|---|---|---|---|
| 4,166,641 A | 9/1979 | Okada et al. | |
| 4,243,248 A | 1/1981 | Scholtz et al. | |
| 4,620,721 A | 11/1986 | Scholtz et al. | |
| 4,836,024 A | 6/1989 | Woehrl et al. | |
| 5,357,141 A | 10/1994 | Nitschke et al. | |
| 5,363,303 A | 11/1994 | Kaneko et al. | |
| 5,416,360 A | 5/1995 | Huber et al. | |
| 5,544,919 A | 8/1996 | Tinkler | |
| 5,620,203 A | 4/1997 | Jeenicke et al. | |
| 5,712,784 A | 1/1998 | Fendt et al. | |
| 5,737,224 A | 4/1998 | Jeenicke et al. | |
| 5,746,444 A * | 5/1998 | Foo et al. .................... | 280/735 |
| 5,788,273 A | 8/1998 | Jeenicke et al. | |
| 5,916,289 A * | 6/1999 | Fayyad et al. ................ | 701/45 |
| 5,967,548 A | 10/1999 | Kozyreff | |
| 5,977,653 A | 11/1999 | Schmid et al. | |
| 6,005,479 A * | 12/1999 | Ide .............................. | 340/438 |
| 6,081,044 A | 6/2000 | Anthofer et al. | |
| 6,099,031 A | 8/2000 | Bischoff | |
| 6,123,357 A * | 9/2000 | Hosoda et al. ........... | 280/730.2 |
| 6,167,335 A * | 12/2000 | Ide et al. ...................... | 701/45 |
| 6,186,539 B1 * | 2/2001 | Foo et al. ................... | 280/735 |
| 6,209,908 B1 * | 4/2001 | Zumpano .................... | 280/729 |
| 6,216,070 B1 * | 4/2001 | Hayashi et al. ................ | 701/45 |
| 6,236,922 B1 * | 5/2001 | Andres ......................... | 701/45 |
| 6,256,563 B1 | 7/2001 | Blank et al. | |
| 6,256,564 B1 * | 7/2001 | Miyaguchi et al. ........... | 701/45 |
| 6,274,948 B1 | 8/2001 | Blank et al. | |
| 6,327,527 B1 * | 12/2001 | Imai et al. ..................... | 701/45 |
| 6,330,500 B1 * | 12/2001 | Moriyama et al. ............ | 701/45 |

FOREIGN PATENT DOCUMENTS

| | | |
|---|---|---|
| DE | 19719454 A1 | 1/1999 |
| DE | 19740019 A1 | 3/1999 |
| EP | 0982199 A1 | 3/2000 |
| WO | 9851544 | 11/1998 |
| WO | WO9912773 A1 | 3/1999 |

OTHER PUBLICATIONS

International Search Report, date of mailing Oct. 17, 2001.

\* cited by examiner

Primary Examiner—Lesley D. Morris
Assistant Examiner—L. Luk

(57) ABSTRACT

The crash detection system employs a plurality of electronic acceleration sensors distributed at different locations of a vehicle body. The plurality of electronic acceleration sensors measures changes in acceleration of the vehicle body at different locations and therefore the rate of deformation of the vehicle body. The signals from the plurality of electronic acceleration sensors are filtered, amplified, and passed to an evaluation unit, which reads and compares the signals. Based on the rate of deformation of the vehicle body, the evaluation unit then makes a determination of the severity of the vehicle crash and communicates this information to a passenger safety system.

9 Claims, 1 Drawing Sheet

DISTRIBUTED ELECTRONIC ACCELERATION SENSING FOR CRASH SEVERITY RECOGNITION

This application claims priority to Provisional Patent Application Ser. No. 60/160,658, filed Oct. 21, 1999.

BACKGROUND OF THE INVENTION

The present invention relates to a system and method for detecting the severity of a crash of a vehicle.

Vehicles employ passenger safety systems such as air bags and passenger restraints that deploy when a vehicle crash is detected by a crash detection system. Typically, a crash detection system consists of an evaluation unit placed inside the vehicle. The evaluation unit has an electronic acceleration sensor, which detects changes in vehicle velocity from within the unit. The signal from this sensor is filtered and then amplified before processing by a controller. The controller then determines when to activate the vehicle's air bag and passenger restraint systems. When a significant change is detected, the evaluation unit instructs the passenger safety system to deploy.

Currently, the electronic acceleration sensor is located with the evaluation unit in the console of the vehicle between the driver and passenger. However, this evaluation unit detects changes in the velocity of the vehicle only from a single location of the vehicle body. In a high-speed collision in contrast to a low-speed collision, the vehicle body will deform. Accordingly, the velocity of the vehicle body will vary across the area of the deformation. Current crash detection systems do not detect this difference in velocity and consequently do not measure the rate of vehicle body deformation, which indicates the degree of severity of a vehicle crash.

Air bag and restraint systems have been developed that deploy to varying degrees to accommodate the varying degrees of intensity of vehicle accidents. For example, air bags that inflate to a higher level in a high-speed collision than in a low-speed collision are known. Passenger restraints may also adjust the level of restraining force based on the accident's intensity. A need therefore exists to determine more precisely the intensity of a vehicle collision.

SUMMARY OF THE INVENTION

In a disclosed embodiment of this invention, a plurality of electronic acceleration sensors is distributed at different locations of a vehicle body. The plural electronic acceleration sensors measure the change in acceleration of the vehicle body across the area of distribution. Signals from the plurality of electronic acceleration sensors are filtered, amplified, and passed to an evaluation unit, which reads and compares the signals. Based on the rate of deformation of the vehicle body, the evaluation unit then makes a determination of the severity of the vehicle crash and communicates this information to a passenger safety system.

The present invention accordingly measures the severity of a vehicle crash, communicating precise information about the accident to the passenger safety system. Moreover, the use of multiple electronic acceleration sensors creates crash detection system redundancy in event of electronic acceleration sensor failure.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

In a vehicle collision, a difference in velocity between points of a vehicle body reflects vehicle deformation. Measuring the rate by which the vehicle body deforms provides an indication of the severity of a crash. In a high-speed collision, the rate of deformation is high. In a low-speed collision, the rate is low or zero.

Figure 1:
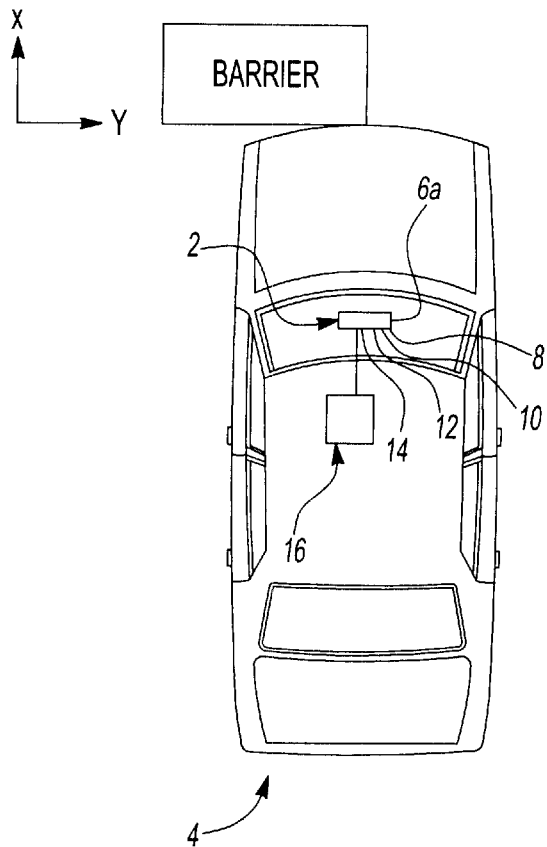
FIG. 1 shows a crash detection system as known in the prior art consisting of an evaluation unit, including an acceleration sensor, placed at a central location of a vehicle body in collision with a barrier.

Current crash detection systems do not measure this rate. FIG. 1 shows a crash detection system as known in the prior art. The crash detection system includes evaluation unit 2 with an electronic acceleration sensor 6A, which detects the rate of change in velocity of vehicle body 4 at the location of evaluation unit 2. The rate of change is measured along the normal path of vehicle body 4, the x-axis, and may be measured along the y-axis to detect side-impact. Filter 8 and amplifier 10 further processes the signal prior to input into a controller 12, also contained within evaluation unit 2. Controller 12 processes the signal and passes the signal to a communication unit 14, which then transmits the signal to passenger safety system 16 to deploy at a predetermined condition. Passenger safety system 16 is of a known type that is able to provide varying restraining force. The details of system 16 may be as known. The present invention simply provides more accurate feedback of the desired (necessary) restraining force.

The crash detection system as known in the prior art, however, provides limited information about the severity of a collision, apprising passenger safety system 16 only to deploy. The crash detection system does not provide information to passenger safety system 16 as to the level of deployment required to respond more optimally to a crash.

Figure 2:
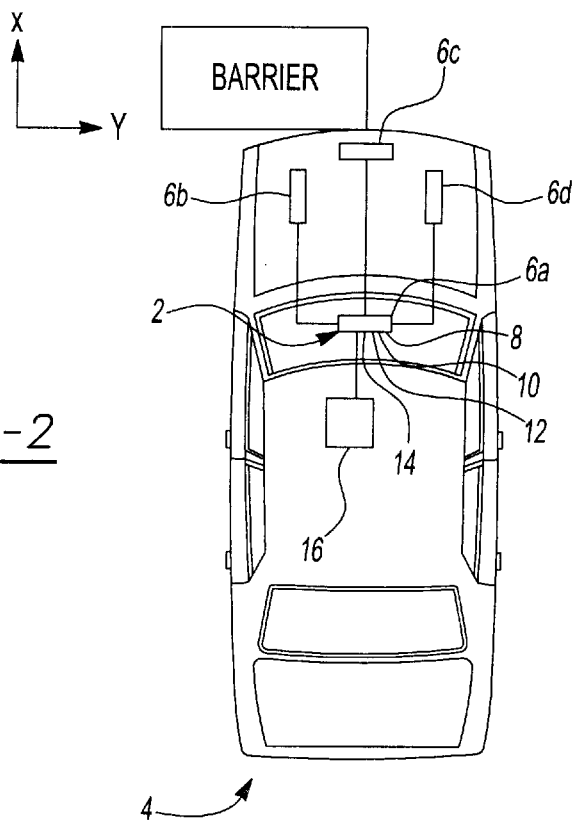
FIG. 2 shows an embodiment of the present invention, including an evaluation unit and a plurality of acceleration sensors distributed through the vehicle body of FIG. 1.

FIG. 2 illustrates an embodiment of the present invention. As shown in FIG. 2, a plurality of electronic acceleration sensors 6A, 6B, 6C and 6D are distributed at various points of vehicle body 4. In this embodiment, electronic acceleration sensors 6A, 6B, 6C and 6D are distributed at the front of vehicle body 4 as well as centrally. The rate of change is measured along the normal path of vehicle body 4, the x-axis, and may be measured along the y-axis to detect side-impact. Filter 8 and amplifier 10 process the signals from electronic acceleration sensors 6A, 6B, 6C and 6D. Evaluation unit 2 reads and compares the values from electronic acceleration sensors oriented in the same direction, such as 6A and 6C, to measure the deformation rate of vehicle body 4 along an axis, either x-axis, y-axis, or any angle between x-axis and y-axis. Through communication unit 14, evaluation unit 2 communicates with passenger safety system 16. Based upon this measure, evaluation unit 2 processes the signal and communicates precise information about the severity of the vehicle crash to passenger safety system 14.

More specifically, in a front-end collision, electronic acceleration sensor 6A is located in the console between the driver and passenger while electronic acceleration sensor 6C is located toward the front of vehicle body 4. Electronic acceleration sensors 6A and 6C are preferably aligned to make measurements of acceleration along the x-axis to detect a front-end collision. Upon collision, the values from electronic acceleration sensors 6A and 6C are filtered, amplified and passed to evaluation unit 2.

After converting the acceleration values to velocity, evaluation unit 2 examines the difference in the velocities as measured by electronic acceleration sensors 6A and 6C to arrive at a velocity of the passenger cab relative to the front of the vehicle.

$$V_{passenger\ cab} = V_{6A} - V_{6C}$$

The velocity of the passenger cab is then multiplied by a force constant to arrive at an estimate of the restraining force needed by the passenger in the collision.

$$\text{Restraining Force} = f(V_{passenger\ cab})$$

The greater the difference between velocities measured by electronic acceleration sensors 6A and 6C the greater restraining force is required. Evaluation unit 2 then transmits this information via communication unit 14 to passenger safety system 16. In this manner, evaluation unit 2 provides information to passenger safety system 16 about the degree of intensity of the collision. A side-impact collision is detected in the same manner with electronic acceleration sensors 6B and 6D oriented relative to vehicle body 4 to take measurements of acceleration preferably along the y-axis. Other forms of the present invention can make detections of vehicle deformation and therefore crash severity in any direction by placing electronic acceleration sensors 6 at different locations of vehicle body 4 and aligning any two sensors 6 in any desired direction.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A crash detection system comprising:
   a plurality of sensors located at different points of a vehicle, at least two of said plurality of sensors making measurements relating to velocity at a first point and at a second point in a forward direction of travel and at least two of said plurality of sensors making measurements relating to velocity along a direction of travel transverse to forward travel at a third point and at a fourth point; and
   an evaluation unit for reading and comparing the measurements of said plurality of sensors to determine a severity of a vehicle crash by examining a difference in the measurements from said plurality of sensors wherein the difference comprises a comparison of a first rate of movement of the first point of the vehicle compared with a second rate of movement of the second point of the vehicle along the forward direction and a comparison of a third rate of movement of the third point of the vehicle with a fourth rate of movement of the fourth point of the vehicle along the direction transverse to the forward direction.

2. The crash detection system of claim 1, including a communication unit for transmitting a signal generated by said evaluation unit to a passenger safety system.

3. A crash detection system of claim 2, wherein said passenger safety system is operable to provide varying levels of restraining force in response to varying degrees of crash severity.

4. A crash detection system of claim 1, wherein at least two of said plurality of sensors take measurements along a direction of forward travel.

5. A crash detection system of claim 1, wherein at least two of said plurality of sensors take measurements along a direction of travel transverse to forward travel.

6. A crash detection system of claim 1, wherein said evaluation unit determines the difference of between the measurements to determine a severity of a crash and the comparison comprises a subtraction of the first rate of movement of the first point of the vehicle from the second rate of movement of the second point of the vehicle along the same direction.

7. A crash detection system of claim 1, wherein said sensors are acceleration sensors.

8. A method for detecting the severity of a vehicle crash comprising:
   providing a network of acceleration sensors at different points of a vehicle;
   reading a first measurement relating to velocity at a first point and a second measurement relating to velocity at a second point from the acceleration sensors;
   reading a third measurement relating to velocity at a third point and a fourth measurement relating to velocity at a fourth point;
   comparing the first measurement and the second measurement generated by the acceleration sensors;
   comparing the third measurement and the fourth measurement generated by the acceleration sensors; and
   determining a severity of a vehicle crash based on a difference in measurements between the first measurement and the second measurement and between the third measurement and the fourth measurement.

9. The method of claim 8, including the step of signaling a passenger safety system to deploy to a degree based on the difference in measurements generated by the acceleration sensors.

* * * * *